No. 867,546. PATENTED OCT. 1, 1907.
O. D. WRIGHT.
ANIMAL TRAP.
APPLICATION FILED SEPT. 6, 1904.

Witnesses,
C. Hieington.
B. E. Robinson.

Inventor,
Orrin D. Wright,
By Howard P. Denison
Attorney.

THE NORRIS PETERS CO., WASHINGTON, D. C.

UNITED STATES PATENT OFFICE.

ORRIN D. WRIGHT, OF ONEIDA, NEW YORK, ASSIGNOR TO ONEIDA COMMUNITY, LIMITED, OF KENWOOD, NEW YORK, A CORPORATION OF NEW YORK.

ANIMAL-TRAP.

No. 867,546.          Specification of Letters Patent.          Patented Oct. 1, 1907.

Application filed September 6, 1904. Serial No. 223,465.

*To all whom it may concern:*

Be it known that I, ORRIN D. WRIGHT, of Oneida, in the county of Madison, in the State of New York, have invented new and useful Improvements in Animal-Traps, of which the following, taken in connection with the accompanying drawings, is a full, clear, and exact description.

This invention relates to improvements in animal traps of the spring-operated-grip-jaw type in which a pair of jaws are held in their open position against the action of the spring by a suitable platform and catch or detent.

It sometimes happens that an animal will free itself from the trap by gnawing its leg or legs off just below the trap jaws where the flesh is numb from pressure, and my object is to provide the jaws with suitable webs or guards which project inwardly from the biting or meeting faces of the jaws a sufficient distance to prevent the animal from gnawing its legs off sufficiently near the biting jaws to release itself.

Figure 1:
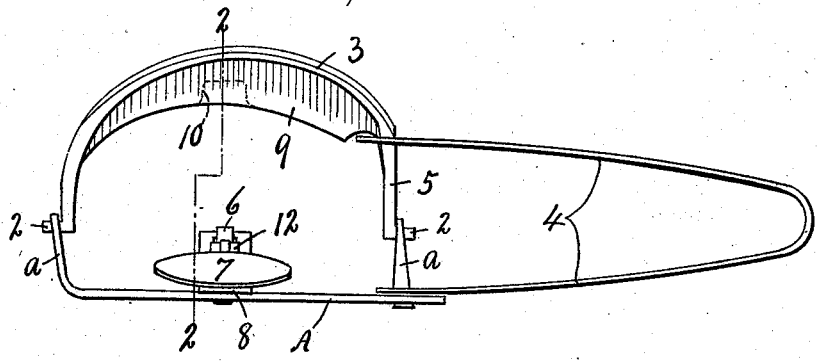
Figure 2:
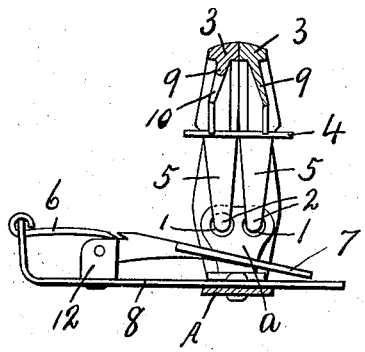

In the drawings—Figure 1 is an elevation of the closed trap embodying the features of my invention. Fig. 2 is a transverse sectional view taken on line 2—2, Fig. 1.

A— represents a supporting-base having upturned ears —a— in which are formed suitable apertures —1— for receiving the pintles —2— of a pair of jaws —3—. A spring —4— is bent in the form of a loop and has one end bearing upon the upper face of the base —A— and its other arm is provided with the usual opening for receiving the depending arms, as —5— at the adjacent end of the jaws whereby said jaws are forced to and held in their closed position. The jaws are opened and set in the usual manner by compressing the upper arm of the spring below the adjacent pintles —2— and then bringing a catch or detent —6— over one of the jaws and into engagement with a suitable platform —7—, which, together with the detent —6—, is mounted upon a suitable cross arm —8— projecting laterally from the base —A—.

The particular feature of my invention consists in providing each jaw with a lengthwise depending rib —9— which diverge or flare laterally or transversely from the meeting faces of the jaws for forming a space between the flanges when the meeting faces of the jaws are engaged with each other, or closed and between which the leg of the trapped animal becomes wedged against withdrawal. By this construction, the gripping or biting edges of the jaws are some distance above the inner edges of the flanges or webs —9—, which latter serve as guards to prevent the animal from gnawing the numbed portion of the leg or legs close to said biting edges, and therefore, if such portions of the leg which might be accessible to the animal below the webs were severed the biting edges of the jaws would still retain their grip upon the leg of the animal and prevent its release.

It will be observed that one of the jaws at the side of the detent —6— is cut away at —10—, as indicated by dotted lines in Fig. 1, and the object of this is merely to form a clearance for the support, as —12—, of the platform —7— when this jaw is rocked to its open position.

The operation of my invention will now be readily understood upon reference to the foregoing description and the accompanying drawing.

Having thus described my invention what I claim and desire to secure by Letters Patent is—

An animal trap comprising a supporting base provided with upwardly projecting apertured ears, opposite jaws journaled in said ears, a spring for closing said jaws, means for holding the jaws in their open position, said jaws having inwardly projecting lengthwise flanges substantially midway between their inner and outer edges and diverging laterally from the meeting faces of the jaws when the latter are closed and between which flanges the leg of the animal will be wedged against withdrawal.

In witness whereof I have hereunto set my hand this 30 day of August 1904.

ORRIN D. WRIGHT.

Witnesses:
    LILY D. CRAGIN,
    MARGARET E. KINSLEY.